United States Patent [19]
Golser et al.

[11] 3,853,947
[45] Dec. 10, 1974

[54] PURIFYING 1,4-DICYANOBUTENES

[75] Inventors: Leopold Golser; Erich Schwartz, both of Ludwigshafen; Hans-Martin Weitz, Frankenthal, all of Germany

[73] Assignee: Badische Anilin- & Soda-Fabrik Aktiengesellschaft, Ludwigshafen/Rhine, Germany

[22] Filed: Mar. 7, 1973

[21] Appl. No.: 338,758

[30] Foreign Application Priority Data
Mar. 8, 1972 Germany .................... 22 11 060

[52] U.S. Cl. .......................................... 260/465.8 R
[51] Int. Cl. .......................................... C07c 121/30
[58] Field of Search ............................ 260/465.8 R

[56] References Cited
UNITED STATES PATENTS

| | | | |
|---|---|---|---|
| 2,478,285 | 8/1949 | Langkammerer | 260/465.8 R |
| 2,570,794 | 10/1951 | Grigsby et al. | 260/465.8 R |
| 2,695,912 | 11/1954 | Hartig | 260/465.8 R |
| 2,803,643 | 8/1957 | Halliwell | 260/465.8 R |
| 3,152,186 | 10/1964 | Campbell et al. | 260/465.8 R X |
| 3,206,497 | 9/1965 | Oblad | 260/465.8 R X |
| 3,350,281 | 10/1967 | Romani et al. | 260/465.8 R X |
| 3,671,569 | 6/1972 | Chabardes et al. | 260/465.8 D |

FOREIGN PATENTS OR APPLICATIONS

| | | | |
|---|---|---|---|
| 756,243 | 9/1956 | Great Britain | 260/465.8 |

*Primary Examiner*—Joseph P. Brust
*Attorney, Agent, or Firm*—Johnston, Keil, Thompson & Shurtleff

[57] ABSTRACT

Recovery of pure 1,4-dicyanobutenes from 1,4-dicyanobutenes containing halogen, particularly chlorine or bromine, by treatment with a hexamethylenediamine or with dihexamethylenetriamine in the liquid phase and separation of the 1,4-dicyanobutenes from the reaction products of the added hexamethylenediamine with the halogen compound.

3 Claims, No Drawings

PURIFYING 1,4-DICYANOBUTENES

The invention relates to a process for the recovery of pure 1,4-dicyanobutenes from 1,4-dicyanobutenes contaminated by halogen compounds.

Organic dinitriles such as adiponitrile or 1,4-dicyanobutenes are valuable intermediates for the production of diamines and consequently for the production of polyamides. Dinitriles obtained from dihalobutanes or dihalobutenes and cyanides or hydrocyanic acid in the presence of suitable acid acceptors (cf. for example German Pat. No. 1,518,553) always contain small amounts of halogen compounds, for example unreacted dibromobutanes or dibromobutenes, bromocyanobutanes, bromocyanobutenes, bromohydroxybutanes, bromohydroxybutenes, tetrabromobutane, tribromobutene, and partial nitrilation and hydrolysis products. Bromine of commercial quality used for the production of the dibromo compounds always contains a certain amount of chlorine, as a rule up to 0.5 percent by weight. Certain amounts of chlorine compounds are therefore always formed in the bromination. Naturally these react more slowly in the reaction with hydrocyanic acid or with cyanides than the corresponding bromine compounds, so that dicyano compounds thus prepared often contain not only bromine but also chlorine compounds. Halogen compounds give trouble in subsequent operations, particularly the catalytic hydrogenation of for example dicyanobutene into adiponitrile and hexamethylenediamine, and therefore have to be removed as completely as possible without great loss of the very reactive dicyanobutenes. Moreover the halogen compounds are often strongly corrosive and thus make handling of the dinitriles difficult.

Although it is possible in principle to separate halogen-containing impurities to a certain extent by careful distillation of the dinitriles, this is very expensive because not only do efficient fractionation columns have to be used but also a high reflux ratio. Moreover the corrosivity of the halogen compounds necessitates the use of corrosion-resistant materials and this involves high costs. Moreover long residence times at high temperature (such as are unavoidable in distillation with a high reflux ratio) cause considerable decomposition of thermally unstable dinitriles.

A number of methods for removing halogen compounds from dicyanobutenes, have already been described in the literature. According to U.S. Pat. No. 2,570,794 the halogen content of 1,4-dicyanobutene can be decreased by dissolving it in a suitable inert solvent such as benzene and heating the solution in the presence of water and an adequate amount of trimethylamine or triethylamine at a temperature of from 90° to 180°C. The pressure is chosen so that benzene and trimethylamine remain in the liquid phase. After the reaction is over the two phases are separated and the 1,4-dicyanobutene is recovered by distillation of the nonaqueous phase.

According to U.S. Pat. No. 2,695,912 a decrease in the chlorine content of dinitriles is achieved by treatment of solution of the crude dinitrile in an inert solvent with an aqueous alkaline solution of suitable pH, the reactive chlorine compounds being hydrolyzed.

These two prior art methods have substantial disadvantages. Trimethylamine and triethylamine react only fairly slowly with the halogen compounds to be removed even at elevated temperature and the long reaction periods result in heavy loss of valuable dinitriles by decomposition. Moreover considerable expense is involved in separating the amines supplied from the dinitriles to such an extent that they do not give trouble in the end product, for example in hydrogenation to the diamine. Aqueous caustic alkali solutions also cause only a fairly slow destruction of the organic halides so that great loss of alkali-sensitive dinitriles occurs also upon heating the dinitriles with aqueous caustic alkali solution.

It is an object of the invention to provide a simple and effective process for the purification of 1,4-dicyanobutenes which contain halogen compounds as impurities. It is another object of the invention to provide a process for the purification of 1,4-dicyanobutenes yielding 1,4-dicyanobutenes which can easily be hydrogenated to the corresponding hexamethylenediamine.

We have found that a pure 1,4-dicyanobutene is obtained advantageously from 1,4-dicyanobutenes which contain impurities containing halogen, particularly chlorine or bromine, by treatment with hexamethylenediamine and recovery of the pure 1,4-dicyanobutene by treating the dicyanobutene to be purified with 1,6-hexamethylenediamine or with dihexamethylenetriamine in the liquid phase and separating the 1,4-dicyanobutene from the reaction products of the added hexamethylene diamine with the halogen compounds.

The claimed process is e. g. suitable for the purification of the various dicyanobutenes such as dihydromucononitrile, 1,4-dicyanobutene-1-cis or 1,4-dicyanobutene-1-trans dinitrile; these compounds usually contain halogen-containing impurities if they have been prepared from the corresponding dibromo or dichloro compounds by reaction with alkali metal cyanides or hydrocyanic acid. Halogen-containing impurities are however often also contained therein when such 1,4-dicyanobutenes have been prepared in halogen-containing solvents. The impurities are therefore products which either remain by incomplete reaction of the starting materials with cyanides or hydrocyanic acid or which were already contained in small amounts as impurities in the dihalogen compounds on which the dinitriles are based, for example highly halogenated starting materials such as, for example, tribromobutanes, tribromobutenes or tetrabromobutanes, and their partial nitrilation products and possibly hydrolysis products. Small amounts of chlorine compounds often also remain because of the differential reactivity of bromine and chlorine compounds while the corresponding bromine compounds react with the cyanides or hydrocyanic acid. The content of halogen-containing compounds in the 1,4-dicyanobutene to be purified is generally not more than 0.05 to 10 percent by weight based on the 1,4-dicyanobutene.

Apart from hexamethylenediamine high boiling distillation residues of hexamethylenediamine which consist mainly of dimeric or trimeric compounds such as dihexamethylenetriamine may also be used.

It is of particular advantage to add that hexamethylenediamine which has been obtained in the hydrogenation of the 1,4-dicyanobutene to be purified. Isolation of the hexamethylenediamine obtained in the hydrogenation is greatly facilitated in this way.

The hexamethylenediamine to be added is conveniently used in a stoichiometric amount in relation to the impurities present as halogen compounds, stoichiometric meaning an amino group for each halogen atom. When a smaller amount of amine than this is added, the content of halogen-containing compounds is decreased but whether the desired degree of purity is achieved or not depends on the amount of halogen-containing compounds present. It is advantageous to use a certain excess beyond the amount of hexamethylenediamine stoichiometrically necessary, for example up to fifteen times, particularly up to three times, the stiochiometric amount. Large amounts of hexamethylenediamine often give rise to isomerization of unsaturated compounds. For example solid 1,4-dicyano-2-trans-butene (melting point 75°C) is extensively isomerized into liquid 1,4-dicyanobutene-(1) whose cis- and trans-isomers melt at from −25° to −23°C and at from −13°C to −12°C.

Treatment of the 1,4-dicyanobutene to be purified with hexamethylenediamine is generally carried out in liquid phase at from 25° to 240°C, preferably from 50° to 180°C. The duration of the treatment depends as usual on the temperature used, on the amount of the hexamethylenediamine added and on the desired end content of halogen compounds in the 1,4-dicyanobutene. Periods of from five to one hundred and fifty minutes, preferably from ten to fifty minutes, are generally used, shorter periods being possible at the higher temperatures and with the larger amounts of diamine.

Treatment is carried out in the liquid phase, at the treatment temperature, the melt can be treated in this way. The use of solvents may however also be advantageous in the purification of 1,4-dicyanobutene. Although a high concentration of the 1,4-dicyanobutene in the solvent is generally preferred, dilute solutions are often easier to handle; the concentration of the 1,4-dicyanobutene in the solvent should not however be less than 5 percent by weight. All substances which are inert under the reaction conditions may be used as solvents; it is advantageous to use aromatic hydrocarbons such as benzene, toluene, xylenes, cumene, or ethylbenzene. The boiling point of the solvent should differ sufficiently from that of the 1,4-dicyanobutene for separation to be carried out easily by distillation; it is advantageous for the boiling point to be about 20°C higher or preferably about 20°C lower than that of the 1,4-dicyanobutene to be purified.

It has been found that the depletion factor in halogen compounds from the 1,4-dicyanobutene assumes the maximum when the purification is carried out without solvent. As dilution of the 1,4-dicyanobutene to be purified is increased by a solvent, a greater excess of hexamethylenediamine or a longer reaction period or a higher temperature is necessary to obtain 1,4-dicyanobutene of the same purity as when the hexamethylenediamine treatment is carried out without any solvent.

It has proved to be advantageous in some cases to treat the 1,4-dicyanobutene to be purified in two stages rather than in one stage. This may be particularly convenient when the halogen content of the 1,4-dicyanobutene is high, for example amounting to from 0.5 to 1 percent by weight like the dicyanobutenes sensitive to alkali. The 1,4-dicyanobutenes have the property in a prolonged treatment with a large amount of hexamethylenediamine at elevated temperature of partly resinifying and this involves loss of valuable 1,4-dicyanobutene. Only part of the impurities to be separated is then separated in the first stage.

The amount of hexamethylenediamine required for removal of halogen may also be added all at once or gradually during the purification operation so as to avoid a momentary large amount of the free hexamethylenediamine in the case of stable or slow-reacting halogen compounds. This method also serves to protect sensitive dicyanobutene.

Various methods may be used to separate the dicyanobutene and the choice of method often depends on the intended further processing of the dicyanobutene.

Since the products formed in the reaction of the hexamethylenediamine with the halogen compounds are difficulty volatile they may for example be separated from the 1,4-dicyanobutene direct by distillation or by crystallization.

To separate the 1,4-dicyanobutene from (a) diamines used in excess in relation to the halogen compounds and (b) reaction products of halogen compounds and hexamethylenediamine methods other than distillation are also suitable. Thus in many cases it is sufficient, after cooling to room temperature, to carry out an extraction with a non-oxidizing acid which has a pK of more than 10, for example with 5 percent sulfuric acid. Both inorganic and organic acids are suitable, for example sulfuric acid, phosphoric acid, nitric acid, perchloric acid, acetic acid, formic acid, toluenesulfonic acid, methane-sulfonic acid, trifluoroacetic acid, oxalic acid and succinic acid. It is preferred to use aqueous solutions, particularly those having concentrations of up to 10 percent by weight. The use of acids devoid of halogen is preferred. In this way it is possible to remove from the organic phase all hexamethylenediamine still present in the organic dinitrile solution and the salt-like reaction products containing halogen which have been formed from hexamethylenediamine and halogen compounds. The pure 1,4-dicyanobutene or the 1,4-dicyanobutene solution may for example then be fed direct to a catalytic hydrogenation; if desired it may be purified by distillation or crystallization prior to further processing.

In some cases it is advantageous, after the washing with acid, to carry out a washing with dilute (i.e., up to 5 percent) aqueous alkali metal hydroxide or sodium carbonate solution or water to ensure that no droplets of acid remain in the organic phase to cause corrosion in later stages of processing. It is often also advantageous to carry out the washing after the hexamethylenediamine treatment simply with water rather than with dilute acid. The halogen-containing salt-like products from hexamethylenediamine and halogen compound dissolve practically completely in the aqueous phase while a small remainder of the hexamethylenediamine remains in the organic phase corresponding to the distribution equilibrium at the temperature chosen. These small amounts of hexamethylenediamine mean that the product no longer has any corrosive properties whatever. The washing with alkali can be dispensed with in this way and the product may be immediately hydrogenated without any further purification or separating stages.

The 1,4-dicyanobutene or the 1,4-dicyanobutene solution may however also be subjected to a distillation with the residual hexamethylenediamine from the water wash. The hexamethylenediamine present in a small amount thus reacts with any traces of halogen compound present at the elevated temperature in the still so that the halogen content of the 1,4-dicyanobutene distilled off is yet further decreased. A small hexamethylenediamine content moreover permits the bottoms temperature in the distillation of the high boiling alkali-sensitive 1,4-dicyanobutene to be increased, i.e., to carry out the distillation in a range which is more convenient industrially.

A more or less extensive decrease is effected in the halogen-containing impurities depending on the amount of hexamethylenediamine and the experimental conditions, i.e., temperature, reaction duration and removal of reaction products after the treatment. Generally a decrease in the halogen content to about 50 to 20 ppm is sufficient. The loss of 1,4-dicyanobutene occurring in the purification is generally less than 1 percent and in most cases even less than 0.5 percent based on the 1,4-dicyanobutene to be purified.

The following Examples illustrate the invention.

EXAMPLE 1

100 parts by weight of 1,4-dicyanobutene-2-trans (which has been obtained by the method of German Pat. No. 1,518,553 by reaction of dibromobutene and hydrocyanic acid in the presence of an aqueous $NaH_2PO_4$ buffer solution and which, after separation of hydrocyanic acid, is extracted from this buffer solution by extraction with 400 parts by weight of toluene) has the toluene distilled off, 2 parts by weight of hexamethylenediamine is added and the whole is heated for thirty minutes at 100°C. The dicyanobutene is then distilled off from the residue.

Whereas the bromine content of the dicyanobutene was 0.5 percent prior to the purification stage, only 45 ppm of bromine could be detected analytically after the treatment with hexamethylenediamine.

EXAMPLE 2

100 parts by weight of dicyanobutene (prepared by the method described in Example 1) has 200 parts of toluene and 1.5 parts of hexamethylenediamine added to it and is heated for twenty minutes at 100°C. Then first the toluene and then the dicyanobutene is distilled off from the residue.

The bromine content can be decreased from 0.43 percent of bromine in the feed dicyanobutene to 85 ppm in this purification stage.

EXAMPLE 3

100 parts by weight of dicyanobutene, prepared according to the method described in Example 1, has 0.7 part by weight of hexamethylenediamine added to it and is heated for fifteen minutes at 100°C. After having been cooled to room temperature the reaction mixture is well mixed once with 10 parts by weight of 3 percent sulfuric acid. After the aqueous phase has been separated, the same operation is repeated with 10 parts by weight of water. After the water has been separated the content of bromine in the dicyanobutene is 55 ppm. The original bromine content was 0.15 percent.

EXAMPLE 4

The same mixture as in Example 3 is not washed with dilute sulfuric acid and then with water, but is washed only with 10 parts by weight of water and then the organic phase is distilled. The distillate is a dicyanobutene whose bromine content has been decreased by this purification operation from 0.15 percent to less than 10 ppm.

We claim:

1. A process for recovering pure 1,4-dicyanobutane from 1,4-dicyanobutene which contains chlorinated or brominated impurities, by treatment with hexamethylenediamine and recovery of the pure 1,4-dicyanobutene, wherein the 1,4-dicyanobutene to be purified is treated in the liquid phase with 1,6-hexamethylenediamine or with dihexamethylenetriamine and the 1,4-dicyanobutene is separated from the reaction products of the added hexamethylenediamine with the halogen compounds.

2. A process as set forth in claim 1 wherein the 1,4-dicyanobutene is distilled to separate it from the reaction products.

3. A process as set forth in claim 1 wherein the reaction solution obtained in the treatment of the 1,4-dicyanobutene with hexamethylenediamine is washed with a non-oxidizing acid having a pK value of more than 10 or with water or a mixture of said acid and water and the 1,4-dicyanobutene is recovered or immediately further processed.

* * * * *

UNITED STATES PATENT AND TRADEMARK OFFICE
CERTIFICATE OF CORRECTION

PATENT NO. : 3,853,947
DATED : December 10, 1974
INVENTOR(S) : Leopold Golser, Erich Schwartz, Hans-Martin Weitz It is certified that error appears in the above-identified patent and that said Letters Patent are hereby corrected as shown below:

Column 4, line 19, delete "(a) diamines" and insert --(a) hexamethylenediamines--;

Column 4, line 30, delete "methane-sulfonic" and insert --methanesulfonic--.

Signed and Sealed this seventh Day of October 1975

[SEAL]

Attest:

RUTH C. MASON
*Attesting Officer*

C. MARSHALL DANN
*Commissioner of Patents and Trademarks*